(12) United States Patent
Erickson et al.

(10) Patent No.: US 12,005,641 B2
(45) Date of Patent: Jun. 11, 2024

(54) GREEN BODY INCLUDING A METAL NANOPARTICLE BINDER

(71) Applicant: HEWLETT-PACKARD DEVELOPMENT COMPANY, L.P., Spring, TX (US)

(72) Inventors: Kristopher J. Erickson, Palo Alto, CA (US); Thomas C. Anthony, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/857,362

(22) Filed: Jul. 5, 2022

(65) Prior Publication Data

US 2022/0331867 A1    Oct. 20, 2022

Related U.S. Application Data

(62) Division of application No. 16/080,230, filed as application No. PCT/US2017/044679 on Jul. 31, 2017, now Pat. No. 11,413,687.

(51) Int. Cl.
*B29C 64/165*    (2017.01)
*B22F 1/054*    (2022.01)
(Continued)

(52) U.S. Cl.
CPC ............ *B29C 64/165* (2017.08); *B22F 1/054* (2022.01); *B22F 10/14* (2021.01); *B28B 1/001* (2013.01); *B33Y 10/00* (2014.12); *B33Y 70/00* (2014.12); *C04B 35/62218* (2013.01); *C04B 35/634* (2013.01); *C04B 35/64* (2013.01); *B22F 2304/05* (2013.01); *C04B 2235/3206* (2013.01); *C04B 2235/3217* (2013.01); *C04B 2235/3218* (2013.01); *C04B 2235/3225* (2013.01); *C04B 2235/3232* (2013.01); (Continued)

(58) Field of Classification Search
None
See application file for complete search history.

(56) References Cited

U.S. PATENT DOCUMENTS

| | | |
|---|---|---|
| 6,472,459 B2 | 10/2002 | Morales et al. |
| 9,393,674 B2 | 7/2016 | Keshavan |
| 9,427,627 B2 | 8/2016 | Napadensky |
| 2007/0241482 A1 | 10/2007 | Giller et al. |
| 2014/0038860 A1 | 2/2014 | Skala |

(Continued)

FOREIGN PATENT DOCUMENTS

| | | |
|---|---|---|
| EP | 1252952 | 10/2002 |
| EP | 3117982 | 1/2017 |

(Continued)

OTHER PUBLICATIONS

Bai, J.G. et al; "Inkjet Printable Nanosilver Suspensions for Enhanced Sintering Quality in Rapid Manufacturing"; Nanotech, vol. 18, No. 18. Apr. 5, 2007.

(Continued)

*Primary Examiner* — Jeffrey D Washville
(74) *Attorney, Agent, or Firm* — HP Inc. Patent Department

(57) ABSTRACT

According to an example, a green body may include from about 1 wt. % to about 20 wt. % of a metal nanoparticle binder and a build material powder, wherein the metal nanoparticle binder is selectively located within an area of the green body to impart a strength greater than about 3 MPa.

15 Claims, 3 Drawing Sheets

(51) Int. Cl.
  *B22F 10/14* (2021.01)
  *B28B 1/00* (2006.01)
  *B33Y 10/00* (2015.01)
  *B33Y 70/00* (2020.01)
  *C04B 35/622* (2006.01)
  *C04B 35/634* (2006.01)
  *C04B 35/64* (2006.01)

(52) U.S. Cl.
  CPC ......... *C04B 2235/3244* (2013.01); *C04B 2235/3272* (2013.01); *C04B 2235/3284* (2013.01); *C04B 2235/3286* (2013.01); *C04B 2235/3293* (2013.01); *C04B 2235/3418* (2013.01); *C04B 2235/3826* (2013.01); *C04B 2235/3847* (2013.01); *C04B 2235/3865* (2013.01); *C04B 2235/3873* (2013.01); *C04B 2235/422* (2013.01); *C04B 2235/442* (2013.01); *C04B 2235/5454* (2013.01); *C04B 2235/6026* (2013.01); *C04B 2235/667* (2013.01)

(56) References Cited

U.S. PATENT DOCUMENTS

| | | |
|---|---|---|
| 2014/0167326 A1 | 6/2014 | Jones et al. |
| 2014/0275317 A1 | 9/2014 | Moussa |
| 2015/0069649 A1 | 3/2015 | Bai et al. |
| 2016/0272844 A1 | 9/2016 | Osaka et al. |
| 2017/0087622 A1 | 3/2017 | Cook et al. |
| 2018/0311892 A1* | 11/2018 | Abbott, Jr. ............ B28B 11/243 |

FOREIGN PATENT DOCUMENTS

| | | |
|---|---|---|
| WO | WO-9845107 | 10/1998 |
| WO | 2015/136277 A1 | 9/2015 |
| WO | WO-2017136277 | 8/2017 |

OTHER PUBLICATIONS

Bailey; "Preliminary Testing of Nanoparticle Effectiveness in Binder Jetting Applications"; Aug. 10, 2016, 9 pages.

Kruth et al; "Progress in Additive Manufacturing and Rapid Prototyping"; 1998; CIRP Annals, vol. 47, Issue No. 2, pp. 525-540.

* cited by examiner

GREEN BODY INCLUDING A METAL NANOPARTICLE BINDER

In three-dimensional (3D) printing, an additive printing process may be used to make three-dimensional solid parts from a digital model. 3D printing techniques are considered additive processes because they involve the application of successive layers of material. This is unlike other machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWING

Features of the present disclosure are illustrated by way of example and not limited in the following figure(s), in which like numerals indicate like elements, in which.

DETAILED DESCRIPTION

For simplicity and illustrative purposes, the present disclosure is described by an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D part, and a composition and an agent for use in the method. A 3D part may be printed, formed, or otherwise generated onto a build area platform. The 3D printer may also include a spreader to spread a layer of the composition onto the build area platform, and a printhead to selectively deposit the agent. The 3D printer may form successive layers of the composition, which may be spread and may receive the agent. Energy may be applied to form a green body. To be clear, the term "green body" is used herein to refer to an object having bound build material powder at room temperature and that has been removed from any excess build material powder before the object is subjected to further processing. The further processing can include forming a brown body and/or a final 3D part. In an aspect, the green body can be removed from the 3D printer, and/or subjected to additional heating and/or radiation to melt, sinter, densify, fuse, and/or harden the materials to form a brown body and/or a final 3D part. As used herein "3D printed part," "3D part," "3D object," "object," or "part" may be a completed 3D printed part or a layer of a 3D printed part.

Figure 1:
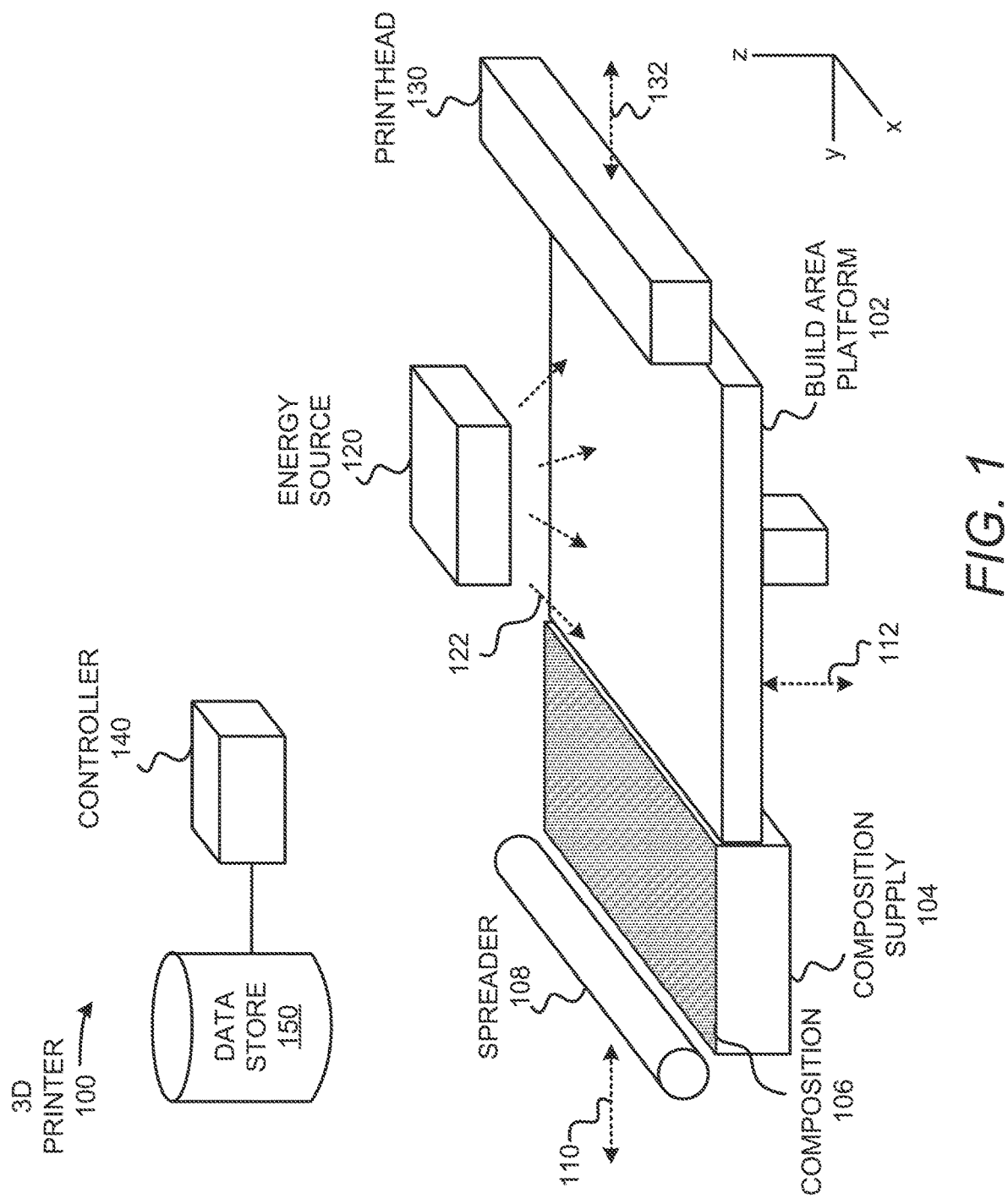
FIG. 1 shows a simplified isometric view of an example three-dimensional (3D) printer for generating, building, or printing three-dimensional parts.

With reference first to FIG. 1, there is shown a simplified isometric view of an example 3D printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein. It should also be understood that the components of the 3D printer 100 depicted in FIG. 1 may not be drawn to scale and thus, the 3D printer 100 may have a different size and/or configuration other than as shown therein. The 3D printer may be used to form a green body including from about 1 wt. % to about 20 wt. % of a metal nanoparticle binder and a build material powder, in which the metal nanoparticle binder can be selectively located within an area of the green body to impart a strength greater than about 3 MPa to the area. The green body may include from about 1 wt. % to about 20 wt. % of a metal nanoparticle binder; a polymer binder; and a build material powder, in which the metal nanoparticle binder can be selectively located within an area of the green body to impart a strength greater than about 3 MPa to the area. In an aspect, the metal nanoparticle binder may be present in an area of the green body having a predicted internal stress that exceeds a threshold value based upon analysis of the proposed green body. The threshold value may be in a range from about 0.3 MPa to about 3 MPa, and as a further example about 1 MPa. The analysis can be a finite element analysis that is performed prior to formation of the green body.

The 3D printer 100 is depicted as including a build area platform 102, a composition supply 104 containing the composition 106, and a spreader 108. The build area platform 102 may be integrated with the 3D printer 100 or may be a component that is separately insertable into the 3D printer 100, e.g., the build area platform 102 may be a module that is available separately from the 3D printer 100. The composition supply 104 may be a container or surface that is to position the composition 106 between the spreader 108 and the build area platform 102. The composition supply 104 may be a hopper or a surface upon which the composition 106 may be supplied. The spreader 108 may be moved in a direction as denoted by the arrow 110, e.g., along the y-axis, over the composition supply 104 and across the build area platform 102 to spread a layer of the composition 106 over a surface of the build area platform 102.

The composition 106 may include a build material powder. The build material powder may be selected from the group consisting of metals, metal alloys, and ceramics. Non-limiting examples of metals include alkali metals, alkaline earth metals, transition metals, post-transition metals, lanthanides, and actinides. The alkali metals may include lithium, sodium, potassium, rubidium, cesium, and francium. The alkaline earth metals may include beryllium, magnesium, calcium, strontium, barium, and radium. The transition metals may include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, and gold. The post-transition metals include aluminum, indium, tin, thallium, lead, and bismuth. In an example, the build material powder may be chosen from aluminum, copper, $Ti_6Al_4V$, $AlSi_{10}Mg$, bronze alloys, stainless steel, Inconel, and cobalt-chromium, and nickel-molybdenum-chromium alloys.

Non-limiting examples of metal alloys include steel, solder, pewter, duralumin, phosphor bronze, amalgams, stainless steel alloys 303, 304, 310, 316, 321, 347, 410, 420, 430, 440, PH13~8, 17~4PH; Fe/Ni, Fe/Si, Fe/Al, Fe/Si/Al, Fe/Co, magnetic alloys containing Fe/Co/V; satellite 6 cobalt alloy including satellites 12; copper, copper alloys, bronze (Cu/Sn), brass (Cu/Zn), tin, lead, gold, silver, platinum, palladium, iridium, titanium, tantalum, iron, aluminum alloys, magnesium including alloys, iron alloys, nickel alloys, chromium alloys, silicon alloys, zirconium alloys, gold alloys, and any suitable combination.

The ceramics may be nonmetallic, inorganic compounds, such as metal oxides, inorganic glasses, carbides, nitrides, and borides. Some specific examples include alumina ($Al_2O_3$), $Na_2O/CaO/SiO_2$ glass (soda-lime glass), silicon carbide (SiC), silicon nitride ($Si3N_4$), silicon dioxide ($SiO_2$), zirconia ($ZrO_2$), yttrium oxide-stabilized zirconia (YTZ), titanium dioxide ($TiO_2$), or combinations thereof. In an example, the build material powder may be a cermet (a metal-ceramic composite).

The 3D printer 100 is further depicted as including a printhead 130 that may be scanned across the build area platform 102 in the direction indicated by the arrow 132, e.g., along the y-axis. The printhead 130 may be, for instance, a thermal inkjet printhead, a piezoelectric printhead, etc., and may extend a width of the build area platform 102. Although a single printhead 130 has been depicted in FIG. 1, it should be understood that multiple printheads may be used that span the width of the build area platform 102. Additionally, the printheads 130 may be positioned in multiple printbars. The printhead 130 may also deposit an agent over a selected area of a layer of the composition 106. In an aspect, multiple printheads 130 may independently deposit the same or different agent over a selected area of a layer of the composition 106. In an aspect, the multiple printheads 130 can simultaneously or sequentially deposit the same or different agents over a selected area of a layer of the composition 106.

In one example, a first printhead may selectively deposit an agent including a polymer binder over an area of the composition 106. In another example, a second printhead may selectively deposit an agent including a metal nanoparticle binder over an area of a layer of the composition 106. In another example, a printhead may selectively deposit an agent including a polymer binder and a metal nanoparticle binder over an area of the composition 106. In a further example, a printhead may selectively deposit an agent including a polymer binder and a metal salt binder over an area of the composition 106.

The area of composition 106 may include an area in need of additional strength. These areas can be determined prior to spreading the composition 106 on the build platform and be based upon the green body geometry and the further processing of the green body, i.e., removing the green body from the 3D printer into any intermediate processing and, for example, into an annealing furnace. These areas can also be determined based upon an analysis of the proposed green body, including a finite element analysis that may determine predicted stress levels, such as those areas having a predicted stress over about 1 MPa. The printhead 130 may selectively deposit a metal nanoparticle binder in an area of the green body to impart strength to the area, i.e., improve local strength in an area, such as a strength greater than about 3 MPa. The selective deposition of the metal nanoparticle binder in the areas with a predicted stress level exceeding about 1 MPa may improve the local strength in that area to greater than about 3 MPa. The selected area may include bridges, cantilevers, thin walls, edges, exterior corners, middle sections of large parts, middle section of high aspect ratio parts, small features, junction positions, or combinations thereof. There may be other areas of the green body in which improved local strength may not be needed or required. In these other areas, the printhead 130 may selectively deposit a lesser amount of metal nanoparticle binder, for example, no metal nanoparticle binder, to impart a strength in these other areas of less than about 3 MPa.

The agent may be a composition including various components that may be applied to the layer of the composition 106. Non-limiting examples of components of the agent include a polymer binder, a metal nanoparticle binder, a pigment, a dye, a solvent, a co-solvent, a surfactant, a dispersant, a biocide, an anti-cogation agent, viscosity modifiers, buffers, stabilizers, and combinations thereof. The presence of a co-solvent, a surfactant, and/or a dispersant in the agent may assist in obtaining a particular wetting behavior with the composition 106. In an aspect, more than one agent may be used during the 3D printing process. As an example, an agent including a polymer binder may be deposited over a selected area of the composition 106. As another example, an agent including a metal nanoparticle binder may be deposited over a select area of the composition 106.

The polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be selected from the group consisting of polypropylene, polyethylene, low density polyethylene, high density polyethylene, polyethylene oxide, polyethylene glycol, acrylonitrile butadiene styrene, polystyrene, styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, and polyether ether ketone.

The polymer binder may have a melting point temperature less than about 250° C., for example it may range from about 50° C. to about 249° C., for example from about 60° C. to about 240° C., and as a further example from about 70° C. to about 235° C.

The polymer binder may be present in the agent in an amount ranging from about 1% to about 6% by volume, for example from about 2% to about 5%, and as a further example from about 3% to about 5% by volume. In another aspect, the polymer binder may be present in the agent in an amount up to 100% by volume loading, for example, if using a piezo ink jet to jet the polymer precursor materials. The amount of the polymer binder may be chosen to provide shape integrity to the green body.

The agent may further include other suitable binders such as metal salts, sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used; however the dissolution kinetics may be slower.

The agent may include a metal nanoparticle binder. The metal nanoparticle binder may promote interparticle bonding of the build material powder and/or may increase the interparticle friction between the build material powder. The metal nanoparticle binder may be a material that will bond to the build material powder at temperatures which are in or below the relevant debile temperature range. For example, without limitation, the metal nanoparticle binder may be the same ceramic, metal or metal alloy or a metal or metal alloy that diffuses into the build material powder, e.g., silver or gold nanoparticles may be used with gold alloy build material powder. Additional non-limiting examples of metal nanoparticle binder may include AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, manganese, aluminum, iron, titanium, niobium, tungsten, chromium, tantalum, cobalt, nickel, vanadium, zirconium, molybdenum, palladium, platinum, copper, silver, gold, cadmium, zinc, and combinations of these with each other and/or with a nonmetallic element or elements. In an aspect, the metal present in the metal nanoparticle binder may be the same as a metal in the build material powder. In another aspect, the metal present in the metal nanoparticle binder may be different from a metal in the build material powder.

The metal nanoparticle binder may be particles with dimensions that are in the nanometer size range, that is, from about 1 nanometer to 1,000 nanometers. In an example, the nanoparticles may be in a size range of about 1 nanometers to about 100 nanometers, and for example within a range of about 1 to about 50 nanometers. The nanoparticles may have any shape. The nanoparticle material kind, size, and shape may be chosen so that the nanoparticles interparticle bond to the build material powder through either chemical or physical bonding to provide structural strength to the as-built object.

The metal nanoparticle may be present in the green body in an amount ranging from about 1 wt. % to about 20 wt. %, for example, from about 1 wt. % to about 15 wt %, and as a further example from about 1 wt. % to about 5 wt. %.

The 3D printer 100 may include multiple printheads 130, in which each printhead 130 may have the same or different agent. In an example, a printhead 130 may have an agent including a polymer binder; and another printhead 130 may have an agent including a metal nanoparticle binder.

Additionally, the agent of each printhead may independently include more than one kind of polymer binder or metal nanoparticle binder. For example, an agent including a metal nanoparticle binder may include metal nanoparticles of both gold alloys and of silver alloys. Similarly, an agent including a polymer binder may include polypropylene and polyethylene. As a further example, an agent may include a polymer binder and a metal nanoparticle binder. This may be useful where it is desired to locally vary the composition of the agent.

Surfactant(s) may be used to improve the wetting properties and the jettability of the agent. Examples of suitable surfactants may include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant may be an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Some examples of a co-solvent include 1-(2-hydroxyethyl)-2-pyrrolidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

Non-limiting examples of suitable anti-cogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Following selective deposition of the agent onto selected areas of the layer of the composition 106, the build area platform 102 may be lowered as denoted by the arrow 112, e.g., along the z-axis. In addition, the spreader 108 may be moved across the build area platform 102 to form a new layer of composition 106 on top of the previously formed layer. In an aspect, the spreader 108 may spread a layer of build material powder. Moreover, the printhead 130 may deposit the agent onto predetermined areas of the new layer of composition 106. For example, the printhead 130 may selectively deposit from about 1 wt. % to about 20 wt. % of a metal nanoparticle binder onto the layer of the build material powder. The above-described process may be repeated until a predetermined number of layers have been formed.

As also shown in FIG. 1, the 3D printer 100 may include a controller 140 that may control operations of the build area platform 102, the composition supply 104, the spreader 108, the energy source 120, and the printhead 130. The controller 140 is also depicted as being in communication with a data store 150. The data store 150 may include data pertaining to a 3D part to be printed by the 3D printer 100.

A green body may be created from areas of the composition 106 that have received the agent from the printhead 130. Upon application of energy 122, such as by heat lamps, ultraviolet lights, and the like, the selectively deposited agent may absorb the energy to form a green body from the spread layer of build material powder, and the deposited metal nanoparticle binder. In an aspect, the green body may include a selected area having a strength greater than about 3 MPa, for example, greater than about 3.5 MPa, and as a, further example, greater than about 4 MPa.

The applied energy 122 may be removed and the green body may cool by removal of the energy. Upon cooling, the formed green body may solidify. The formed green body may be removed from the build platform.

Figure 2:
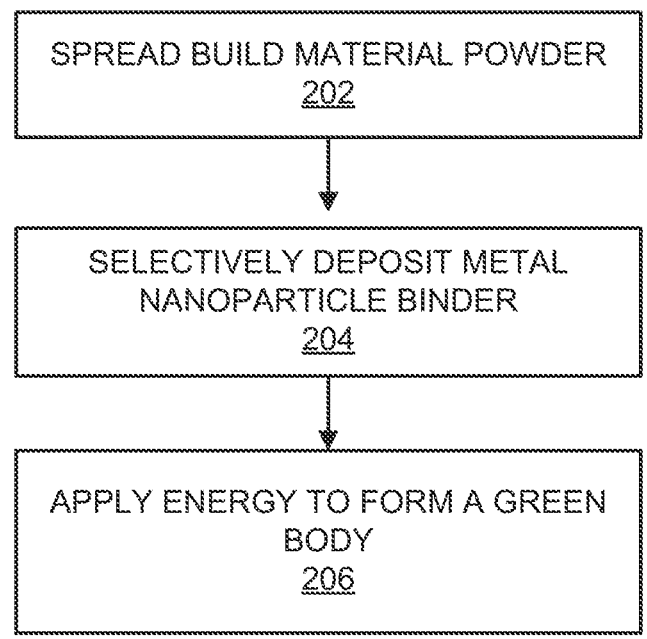
FIGS. 2 and 3, respectively, show flow diagrams of example methods of fabricating a 3D part.
Figure 3:
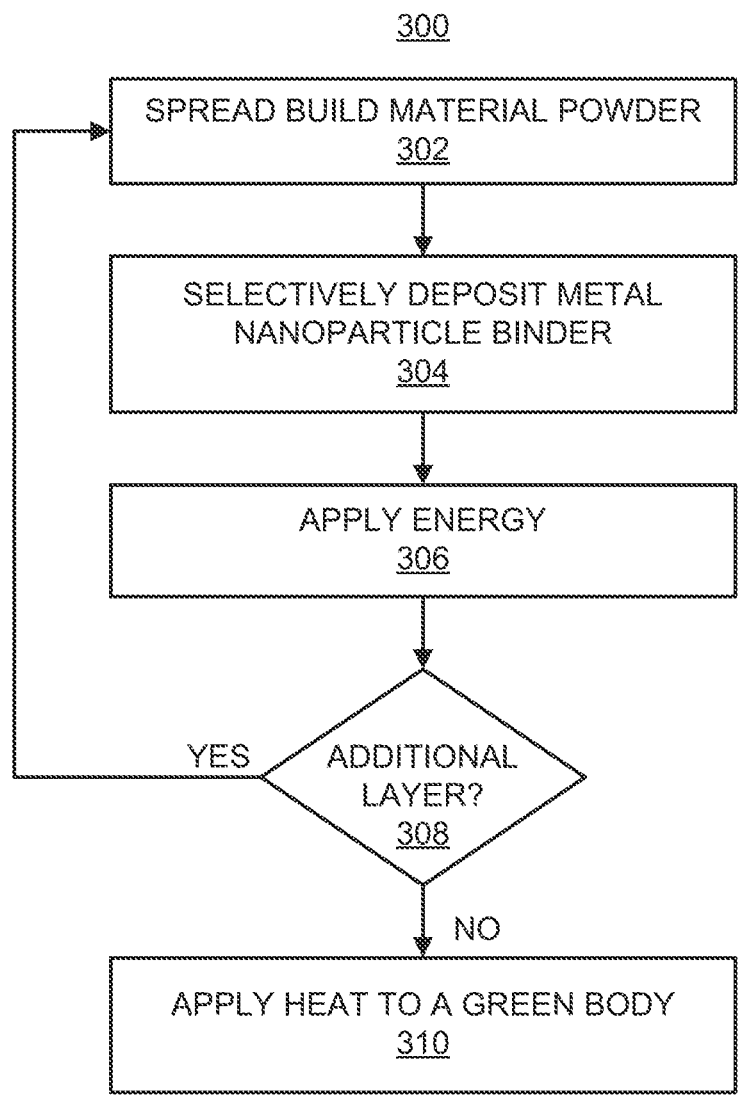

Various manners in which an example 3D part may be fabricated are discussed in greater detail with respect to the example methods 200 and 300 respectively depicted in FIGS. 2 and 3. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the 3D printer 100 illustrated in FIG. 1 for purposes of illustration. It should, however, be clearly understood that 3D printers and other types of apparatuses having other configurations may be implemented to perform either or both of the methods 200 and 300 without departing from the scopes of the methods 200 and 300.

Prior to execution of the method 200 or as part of the method 200, the 3D printer 100 may access data pertaining to a 3D part that is to be printed. By way of example, the controller 140 may access data stored in the data store 150 pertaining to a 3D part that is to be printed. The controller 140 may determine the number of layers of composition 106 that are to be formed and the locations at which an agent, such as a metal nanoparticle binder, from the printhead 130 is to be selectively deposited on areas, to impart improved local strength, of each of the respective layers of composition 106 in order to print the 3D part.

With reference first to FIG. 2, at block 202, a composition 106 may be spread over a build area platform 102. As discussed herein, the composition 106 may be formed of build material powder. In addition, at block 204, a metal nanoparticle binder may be selectively deposited onto an area, to impart improved strength to the area, on the spread layer of the build material powder.

At block 206, energy 122 may be applied onto the spread layer of build material powder, and the selectively deposited metal nanoparticle binder to form a green body. Block 206 may represent a plurality of operations in which multiple layers of build material powder are spread, selectively deposited with metal nanoparticle binder, and supplied with energy to form the green body, in which the metal nanoparticle binder may be selectively located within an area of the green body to impart a strength greater than about 3 MPa to the area.

Turning now to FIG. 3, at block 302, the build material powder may be spread, at block 304, a metal nanoparticle binder may be selectively deposited onto the layer of build material powder. Blocks 302 and 304 may be similar to blocks 202 and 204 discussed above with respect to FIG. 2. In addition, at block 306, energy 122 may be applied in manners similar to those discussed above with respect to block 206. At block 308, a determination may be made, for instance, by a processor of the 3D printer 100, as to whether an additional layer of the build material powder is to be formed. In response to a determination that another layer of the build material powder is to be formed, blocks 302-306 may be repeated on top of a previously deposited layer.

However, in response to a determination that an additional layer is not to be formed, the formed layers, e.g., green body, may be cooled and removed from the 3D printer 100.

Extraneous composition, such as the build material powder may be removed to form the green body. By way of example, the green body may be placed in a media blasting cabinet and the extraneous composition may be sandblasted away from the green body. An air gun or brush may be used to remove extraneous composition. As another example, the extraneous composition may be removed through mechanical vibration or other removal techniques.

Following removal of the extraneous composition, the green body may be subjected to further processing to form a brown body and/or a final 3D part. Heat or radiation may be applied to the green body from a heat or radiation source (not shown). By way of example, the green body may be placed into a furnace or oven that is able to heat the green body at different temperatures, in which the different temperatures may range from a temperature that is approximately equal to the melting temperature of a polymer binder to a temperature that is sufficient to cause the build material powder of the composition to melt and/or sinter with metal nanoparticle binder. The metal nanoparticle binder may interparticle bind with the build material powder to provide increased structural strength to the final 3D part. The interparticle binding may prevent the final 3D part from sagging, warping, breaking, or otherwise disfiguring from an intended shape. This may be beneficial in large 3D parts or 3D parts having thin or unsupported sections.

In another example, the green body may be placed in multiple furnaces or ovens that are each at different temperatures during successive periods of time in order to form the brown body and/or the final 3D part.

The temperatures at which the heat is applied may be progressively increased. That is, at block 310, energy, for example, in the form of heat, may be applied to the green body at a temperature, which may be equal to approximately a melting temperature of a polymer binder. The brown body may no longer include a polymer binder and/or substantial polymer binder residue after a period of time because any residual polymer binder in the brown body may change the chemical composition and properties of the final part. In an aspect, polymer binder removal (i.e., debinding) may be difficult in large objects, such as those objects having greater than 10 mm wall thicknesses.

At block 310, applying energy may further include applying sufficient energy, such as in the form of heat, to sinter the build material powder. The metal nanoparticle binder may include a metal that is the same or different metal in the build material powder.

By way of example, the temperature may progressively increase from about 200° C. to about 230° C. to above, for example above 500° C., to complete debinding and then progressively increase to sintering temperatures around 1000° C. and in other examples, above around 1500° C. In addition, the increasing temperature may cause the density to be increased. The length of time at which the heat is applied may be dependent, for example, on at least one of: characteristics of the heat or radiation source, characteristics of the build material powder; and/or characteristics of the agent. In an example, the heat may be applied in an oxidizing or a reducing atmosphere and with or without an inert gas. In another example, the oxidizing and reducing atmospheres may also be used during annealing to facilitate removal of the molten binder from inside. The heat may also be applied in a vacuum.

In order to determine possible areas of a green body that may need additional local strength, an analysis may be performed. For example, a finite element analysis may be useful for predicting placement and loading of the metal nanoparticle binder in selected areas to impart improved strength to those areas. The analysis may include adding potential forces expected to be applied to the green body during different parts of the process for forming a 3D part including, but not limited to, the printing process, post-printing process, removal from the printer, negative space powder removal, handling of the separated green body (either by hand or an automated process), and placement into a sintering furnace. The placement and loading of the metal nanoparticle binder may impart improved strength, such as above 3 MPa, so that when the green body is removed from the printer and taken to a sintering furnace, the green body does not break or sag.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method, comprising:
spreading a layer of a metal or metal alloy build material powder;
selectively depositing from about 1 wt. % to about 20 wt. % of a metal nanoparticle binder onto the layer of the metal or metal alloy build material powder; and
applying energy to form a green body from the layer of the metal or metal alloy build material powder and the metal nanoparticle binder deposited on the layer of the metal or metal alloy build material powder,
wherein the metal nanoparticle binder is selectively located within a first area of the green body to impart a strength greater than about 3 MPa in the first area.

2. The method of claim 1, further comprising selectively applying a polymer binder to the layer of the metal or metal alloy build material powder.

3. The method of claim 1, wherein selectively depositing the metal nanoparticle binder further comprises selecting the first area based on the first area including a bridge.

4. The method of claim 1, wherein selectively depositing the metal nanoparticle binder further comprises selecting the first area based on the first area including a cantilever.

5. The method of claim 1, wherein selectively depositing the metal nanoparticle binder further comprises selecting the first area based on the first area including a wall with thickness at or below a threshold.

6. The method of claim 1, wherein selectively depositing the metal nanoparticle binder further comprises selecting the first area based on the first area including an exterior corner or edge.

7. The method of claim 1, wherein selectively depositing the metal nanoparticle binder further comprises selecting the first area based on the first area including a middle section of a high aspect ratio part.

8. The method of claim 1, wherein selectively depositing the metal nanoparticle binder further comprises selecting the first area based on the first area including a junction between adjacent parts of the green body.

9. A method, comprising:
spreading a layer of a build material powder;
selectively depositing a first agent including from about 1 wt. % to about 20 wt. % of a metal nanoparticle binder onto the layer of the build material powder;
selectively depositing a second agent including a polymer binder onto the layer of the build material powder, wherein the polymer binder is selected from the group consisting of polypropylene, polyethylene, low density polyethylene, high density polyethylene, polyethylene oxide, polyethylene glycol, polystyrene, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, and polyether ether ketone; and
applying energy to form a green body from the layer of build material powder and the first and second agents deposited on the layer of the build material powder,
wherein the first agent including the metal nanoparticle binder is selectively located within a first area of the green body to impart a strength greater than about 3 MPa in the first area.

10. The method of claim 1, wherein the metal nanoparticle binder is selected from the group consisting of AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, manganese, aluminum, iron, titanium, niobium, tungsten, chromium, tantalum, cobalt, nickel, vanadium, zirconium, molybdenum, palladium, platinum, copper, silver, gold, cadmium, zinc, and combinations thereof.

11. The method of claim 1, wherein the metal nanoparticle binder is present in an amount ranging from about 1 wt. % to about 15 wt. %.

12. The method of claim 1, wherein the first area of the green body has a predicted internal stress that exceeds about 1 MPa based upon analysis of the green body.

13. The method of claim 1, wherein the metal present in the metal nanoparticle binder is the same as a metal in the metal material powder.

14. The method of claim 2, wherein the selectively depositing includes selectively depositing an agent including the metal nanoparticle binder and the polymer binder.

15. The method of claim 1, wherein the metal nanoparticle binder is present in an amount ranging from about 1 wt. % to about 5 wt. %.

* * * * *